(12) United States Patent
Twardowska et al.

(10) Patent No.: US 6,887,931 B2
(45) Date of Patent: May 3, 2005

(54) THERMOSETTING INORGANIC CLAY NANODISPERSIONS AND THEIR USE

(75) Inventors: Helena Twardowska, Dublin, OH (US); Laurence G. Dammann, Powell, OH (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 10/120,181

(22) Filed: Apr. 10, 2002

(65) Prior Publication Data

US 2003/0100657 A1 May 29, 2003

Related U.S. Application Data

(63) Continuation-in-part of application No. 10/037,173, filed on Oct. 23, 2001, now abandoned.

(51) Int. Cl.[7] .............................................. C08K 11/04
(52) U.S. Cl. ...................... 524/445; 524/186; 501/145; 501/147
(58) Field of Search ................................ 524/445, 447, 524/186; 501/145, 148

(56) References Cited

U.S. PATENT DOCUMENTS

| | | | | |
|---|---|---|---|---|
| 3,537,997 A | * | 11/1970 | House ........................ | 508/140 |
| 4,639,007 A | | 1/1987 | Lawrence | |
| 4,739,007 A | | 4/1988 | Okada et al. ............... | 524/789 |
| 4,798,766 A | | 1/1989 | Rice ............................ | 428/404 |
| 4,810,734 A | | 3/1989 | Kawasumi et al. ......... | 523/216 |
| 4,889,885 A | | 12/1989 | Usuki et al. ................ | 524/445 |
| 5,102,948 A | | 4/1992 | Deguchi et al. ............ | 524/789 |
| 5,376,604 A | | 12/1994 | Iwasaki et al. ............. | 523/514 |
| 5,554,670 A | * | 9/1996 | Giannelis et al. ........... | 523/209 |
| 5,585,439 A | | 12/1996 | Lee et al. ................... | 525/178 |
| 5,698,624 A | | 12/1997 | Beall et al. ................. | 524/445 |
| 5,801,216 A | * | 9/1998 | Pinnavaia et al. ......... | 428/304.4 |
| 5,849,830 A | * | 12/1998 | Tsipursky et al. .......... | 524/450 |
| 5,853,886 A | | 12/1998 | Pinnavaia et al. .......... | 428/403 |
| 5,876,812 A | | 3/1999 | Frisk et al. ................ | 428/35.7 |
| 5,955,535 A | | 9/1999 | Vaia et al. .................. | 524/791 |
| 6,057,035 A | | 5/2000 | Singh et al. ................ | 428/403 |
| 6,057,396 A | | 5/2000 | Lan et al. ................... | 524/445 |
| 6,225,374 B1 | | 5/2001 | Vaia et al. .................. | 523/216 |
| 6,271,297 B1 | | 8/2001 | Ishida ........................ | 524/445 |
| 6,287,992 B1 | | 9/2001 | Polansky et al. ............ | 442/59 |
| 6,653,388 B1 | | 11/2003 | Barbee et al. .............. | 524/445 |

FOREIGN PATENT DOCUMENTS

WO    WO 95/14733 A1 *  6/1995

OTHER PUBLICATIONS

Chen T.K., Tien Y. I., Wei K. H.; Synthesis and Characterization of Novel Segmented Polyurethane/Clay nanocomposite viaPoly(caprolactone)/Clay J Poly Sci: Part A: Pol Chem. vol. 37, 2225–2233 (1999).*

Wang M. S., Pinnavaia T. J. Clay–Polymer Nanocomposites Formed from Acidic Derivatives of Montmorillonites and Epoxy Resin Chem. Mater.1994, 6, 468–474.*

"Nanocomposites of layered silicate and EVA copolymer—a general new synthesis route, flame retardancy and potential electrical applications" by Dr. Günter Beyer presented at Nancomposites 2001, Jun. 25–27, 2001. copy enclosed.

"Nanocomposites of layered silicate and EVA copolymer—a general new synthesis route, flame retardancy and potential electrical applications" by Dr. Günter Beyer presented at Nancomposites 2001, Jun. 25–27, 2001.

Doctoral Thesis of Paul Thomas Kelly, "Preparation, Characterization and Properties of Montmorillonite/Epoxy Compounds", Jan. 1994, Case Western Reserve University.

* cited by examiner

*Primary Examiner*—Katarzyna Wyrozebski
(74) *Attorney, Agent, or Firm*—David L. Hedden

(57) ABSTRACT

This invention relates to thermosetting inorganic clay nanodispersions comprising an inorganic clay treated in situ with an intercalation agent and a non-aqueous, chemically reactive, organic intercalation facilitating agent, wherein the amount of intercalation facilitating agent is sufficient to facilitate intercalation and to disperse said inorganic clay. The thermosetting inorganic clay nanodispersions comprise an inorganic clay dispersed in an intercalating agent and an intercalation facilitating agent. Thermosetting inorganic clay nanodispersions are used to prepare thermosetting nanocomposite articles.

17 Claims, No Drawings

THERMOSETTING INORGANIC CLAY NANODISPERSIONS AND THEIR USE

CROSS-REFERENCE TO RELATED APPLICATIONS

This application is continuation-in-part of application Ser. No. 10/037,173 filed on Oct. 23, 2001 now abandoned.

CLAIM TO PRIORITY

Applicants claim the priority date of application Ser. No. 10/037,173 filed on Oct. 23, 2001, which is hereby incorporated by reference.

BACKGROUND OF THE INVENTION (1) Field of the Invention

This invention relates to thermosetting inorganic clay nanodispersions comprising an inorganic clay treated in situ with an intercalation agent and a non-aqueous, chemically reactive, organic intercalation facilitating agent, wherein the amount of intercalation facilitating agent is sufficient to facilitate intercalation and to disperse said inorganic clay. The thermosetting inorganic clay nanodispersions comprise an inorganic clay dispersed in an intercalating agent and an intercalation facilitating agent. Thermosetting inorganic clay nanodispersions are used to prepare thermosetting nanocomposite articles.

(2) Description of the Related Art

A composite is a solid material that results when two or more different materials having their own unique characteristics are combined to create a new material, and the combined properties, for the intended use, are superior to those of the separate starting materials. Typically, the composite is formed by embedding a fibrous material, e.g. glass fibers, into a polymer matrix. While the mechanical properties of a bundle of fibers are low, the strength of the individual fibers is reinforced by the polymer matrix that acts as an adhesive and binds the fibers together. The bound fibers provide rigidity and impart structural strength to the composite, while the polymeric matrix prevents the fibers from separating when the composite is subjected to environmental stress.

The polymeric matrix of the composite is formed from a thermoplastic or thermosetting resin, which is mixed with fibers used to make a composite. Thermoplastic polymers "soften" when heated, and recover their plastic properties when cooled. This reversible process can often be repeated many times. The polymers are thermoplastic because they are not chemically cross-linked. Examples of thermoplastic resins include linear polyethylene, polystyrene, acrylic resins, and nylon.

Thermosetting polymers "set" irreversibly by a curing reaction, and do not soften or melt when heated. The reason they do not soften or melt when they are heated is that they chemically cross-link when they are cured. Examples of thermosetting resins include phenolic resins, unsaturated polyester resins, polyurethane-forming resins, and epoxy resins.

Nanocomposites are composites which are formed by binding materials in the polymeric matrix that have a nanometer size range. Typically, the materials used to form nanocomposites are modified inorganic clays. Thermoplastic molded nanocomposite articles are particularly useful because they have improved mechanical properties, e.g. tensile strength (psi), modulus (ksi), elongation (%), and heat distortion temperature (° C.), when compared to conventional thermoplastic molded composite articles, which are not useful for some applications, e.g. elevated temperature use. On the other hand, conventional thermosetting molded composite articles have strong mechanical properties, so it is not usually necessary to use thermosetting molded nanocomposite articles to obtain improved mechanical properties.

Typical inorganic clays used in preparing nanocomposites include phyllosilicates such as montmorillonite, nontronite, beidellite, volkonskoite, hectorite, saponite, sauconite, magadiite, and kenyaite; vermiculite; and the like. Inorganic clays are typically multi-layered structures where the layers are close in proximity and contain cations of alkali metals or alkaline earth metals, e.g. sodium, potassium, or calcium, between the layers of the inorganic clay. The distance between the layers of the clay is the so-called "d-spacing". Conventionally, in order to prepare nanocomposites from the inorganic clay, the inorganic clay, which is hydrophilic, is treated with water to "swell" the inorganic clay and thereby expand the d-spacing between the layers of the inorganic clay. The swollen clay is then treated with an intercalation agent, e.g. a quaternary ammonium salt, to render the inorganic clay organophilic (i.e. make the inorganic clay compatible with thermoplastic or thermosetting monomers and/or resins) and further increase the d-spacing by exchanging the cations of the inorganic clay with the cations of the intercalation agent. The intercalated inorganic clay is then recovered and dried. The treatment process is cumbersome and adds considerably to the cost of producing intercalated inorganic clays. The dried intercalated inorganic clay is then mixed with a thermoplastic or thermosetting monomer or resin, which exfoliates (separates) some or all of the layers of the inorganic clay. In the case of thermoset resins, the mixture is cured by contacting with a curative and/or curing catalyst.

In order to form an article from the exfoliated inorganic clay, a filler is typically mixed with the exfoliated inorganic clay. Examples of fillers are silicas, talc, calcium carbonate, and aluminas. This mixture is then shaped by introducing it into a pattern. Thermoplastic mixtures are injected into the pattern in a molten state at elevated temperatures and form a nanocomposite article upon cooling. Thermosetting mixtures are introduced into the pattern in a liquid or flowable state, then cured (crosslinked) with a curative and/or curing catalyst to produce a shaped nanocomposite article.

As was mentioned previously, typically nanocomposite articles are not formed with thermosetting polymers because the composites prepared from thermosetting polymers already have good mechanical properties. In addition, the pre-treated intercalated inorganic clays are expensive to use in thermosetting systems. However, if the costs of thermosetting nanocomposite articles could be reduced significantly, these articles could replace conventional thermoset composite articles, e.g. sheet molding compounds (SMC), because of their superior properties.

All citations referred to under this description of the "Related Art" and in the "Detailed Description of the Invention" are expressly incorporated by reference.

BRIEF SUMMARY OF THE INVENTION

This invention relates to thermosetting inorganic clay nanodispersions comprising an inorganic clay treated in situ with a intercalation agent and a non-aqueous, chemically reactive, organic intercalation facilitating agent, wherein the amount of intercalation facilitating agent is sufficient to facilitate intercalation and to disperse said inorganic clay.

The thermosetting inorganic clay nanodispersions comprise an inorganic clay, containing inorganic cations, dispersed in an intercalating agent and an intercalation facilitating agent. The inorganic clay is not pre-treated with water to swell the clay before adding the intercalation facilitating agent.

The layers of the inorganic clay of the nanodispersions have increased d-spacing, as shown by X-ray diffraction. The inorganic clay of the nanodispersion is partially or totally intercalated inorganic clay, i.e. the inorganic cations of the inorganic clay are partially or totally displaced with the cations of the quatemary ammonium salt, but remain in the inorganic clay nanodispersion.

The intercalation facilitating agent aids in separating the layers of the inorganic clay, so that intercalation can occur. It also acts as a dispersing agent for dispersing the intercalated inorganic clay in the nanodispersion.

The partially or totally intercalated thermosetting inorganic clay nanodispersions are produced in situ, i.e. all of the components needed to prepare the nanodispersion are mixed together and the required state is reached without removing water or other components. Thus, the nanocomposite dispersions are less expensive to prepare. Since water is not used to form the intercalated inorganic clay, it does not have to be removed by drying. The chemically reactive monomer and/or resin used to facilitate intercalation does not have to be removed from the system, but instead reacts in the presence of an appropriate curative and/or curing catalyst to become part of the cured nanocomposite article. The use of these nanocomposite dispersions lowers the cost of manufacturing thermosetting nanocomposite articles.

Preferably, the thermosetting inorganic clay nanodispersion is prepared by first mixing the intercalation facilitating agent with the quaternary ammonium salt. This mixture is then added to the inorganic clay and mixed to intercalate the inorganic clay.

Thermosetting inorganic clay nanodispersions are used to prepare thermosetting nanocomposite articles. The thermosetting nanocomposite articles prepared with the thermosetting inorganic clay nanodispersions of this invention have equal or improved properties, particularly increased tensile strengths and elongation, when compared to thermosetting nanocomposite articles prepared with pre-treated inorganic clays, which use water as the swelling agent for intercalation.

BRIEF DESCRIPTION OF THE SEVERAL VIEWS OF THE DRAWINGS

Not Applicable.

DETAILED DESCRIPTION OF THE INVENTION

The detailed description and examples will illustrate specific embodiments of the invention that enable one skilled in the art to practice the invention, including the best mode. It is contemplated that many equivalent embodiments of the invention will be operable besides these specifically disclosed.

The inorganic layered clay used to practice this invention includes phyllosilicates such as montmorillonite, nontronite, beidellite, volkonskoite, hectorite, saponite, sauconite, magadiite, and kenyaite; vermiculite; and the like. Other representative examples include illite minerals such as ledikite; the layered double hydroxides or mixed metal hydroxides; chlorides. Other layered materials or multi-layer aggregates having little or no charge on the surface of the layers may also be used in this invention provided they can be intercalated to expand their interlayer spacing. Mixtures of one or more such materials may also be employed.

Preferred layered materials are those having charges on the layers and exchangeable ions such as sodium, potassium, and calcium cations, which can be exchanged, preferably by ion exchange, with ions, preferably cations such as ammonium cations, or reactive organosilane compounds, that cause the multi-lamellar or layered particles to delaminate or swell. Typically, the negative charge on the surface of the layered materials is at least about 20 milliequivalents, preferably at least about 50 milliequivalents, and more preferably from about 50 to about 120 milliequivalents, per 100 grams of the multilayered material.

Particularly preferred as the inorganic clay are smectite clay minerals such as montmorillonite, nontronite, beidellite, volkonskoite, hectorite, saponite, sauconite, magadiite, and kenyaite, with hectorite and montmorilonite having from about 20 milliequivalents to about 150 milliequivalents per 100 grams material being more preferred. The most preferred inorganic clay is montmorillonite.

Although other intercalation agents known in the art can be used, preferably the intercalation agent is a quaternary ammonium salt. Typically, the quaternary ammonium salts (cationic surface active agents) have from 6 to 30 carbon atoms in the alkyl groups, e.g. alkyl groups such as octadecyl, hexadecyl, tetradecyl, dodecyl or like moieties; with preferred quaternary ammonium salts including octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt, ditetradecyl dimethyl ammonium salt and the like. The amount of quaternary ammonium salt can vary over wide ranges, but is typically used in amount sufficient to replace from 30 to 100 percent of the cations of the inorganic clay with the cations of the intercalation agent. Typically, the amount of quaternary ammonium salt is from 10 to 60 parts by weight based on 100 parts by weight of inorganic clay, and preferably form 20 to 40 parts by weight based on 100 parts by weight of inorganic clay. The quaternary ammonium salt can be added directly to the inorganic clay, but is preferably first mixed with the monomer and/or resin used to facilitate intercalation.

The intercalation facilitating agent is a chemically reactive monomer and/or polymer. The intercalation facilitating agent (1) cures in the presence of an appropriate thermosetting curative and/or curing catalyst, (2) it is compatible with the inorganic clay and quaternary ammonium salt used to prepare the partially or totally intercalated inorganic clay, and (3) is sufficiently small in size so that it can effectively enter the space between the layers of the inorganic clay to be intercalated. For purposes of describing this invention, a "resin" is a substantially ungelled organic polymeric liquid, which when cured becomes a thermosetting plastic. "Ungelled" means that the resin is not cross-linked. If a resin is used to facilitate intercalation, the molecules of the resin must be sufficiently small, so they can enter the space between the layers of the inorganic clay used to form the nanodispersion. Typically, such resins have an average molecular weight of 100 to 10,000, preferably from 250 to 5,000, most preferably from 300 to 3,000.

The intercalation facilitating agent can be added first to the clay or mixed with the intercalation agent before it is added to the clay. The amount of chemically reactive intercalating facilitating agent, preferably a monomer and/or resin, can vary over wide ranges, but is typically used in an amount to achieve a viscosity for the intercalated nanodispersion of 200 to 100,000 cps at 25° C., as measured by a Brookfield viscometer, preferably from 500 to 50,000 cps, and most preferably from 2,000 to 20,000 cps. In terms of weight, the amount of the intercalating facilitating agent is typically from 100 to 5,000 parts by weight, based on 100 parts of inorganic clay, preferably from 300 to 2,000, and most preferably from 400 to 2,000, based on 100 parts of inorganic clay.

Examples of monomers that are reactive with a thermosetting resin include styrene, vinyl esters, glycols, epoxy resins, and acrylic or methacrylic monomers.

The thermosetting inorganic clay nanodispersions can be cured by heating, contact with ultraviolet radiation, and/or catalyst, or other appropriate means. However, in many cases, a curative is added to the thermosetting inorganic clay nanodispersion before curing. For purposes of defining this invention, a "curative" is a monomer and/or resin, which is different from the intercalation facilitating agent, but reacts with the intercalation facilitating agent. The curative can promote further intercalation and exfoliation. The curative will react with the intercalation facilitating agent and cure in situ; or cure in the presence of an appropriate catalyst and/or heat, depending upon the system. The choice of the curative will depend upon the intercalation facilitating agent chosen to facilitate intercalation.

Examples of monomers that can be used as the curative include acrylic monomers, vinyl monomers (e.g. vinyl acetate), isocyanates (particularly organic polyisocyanates), polyamides, and polyamines. Examples of resins that can be used as the curative include phenolic resins (e.g. phenolic resole resins; phenolic novolac resins; and phenolic resins derived from resorcinol, cresol, etc.); polyamide resins; epoxy resins, e.g. resins derived from bisphenol A, bisphenol F, or derivatives thereof, epoxy resins derived from the diglycidyl ether of bisphenol A or a polyol with epichlorohydrin; polyfunctional amines, e.g., polyalkylenepolyamine; unsaturated polyester resins, e.g. reaction products of (a) an unsaturated dicarboxylic acids or their anhydrides (e.g., maleic acid, fumaric acid, maleic anyhydride, citraconic acid or anhydride, and itaconic acid or anhydride), and (b) a dihydric alcohol such as ethylene, propylene, diethylene and dipropylene glycol; allyl resins, e.g. resins derived from diallyl phthalates; urea resins; melamine resins, furan resins; and vinyl ester resins including epoxy (meth)acrylates e.g., reaction products of (meth)acrylic acid and epoxy containing compounds.

For instance, if styrene were used to facilitate intercalation, then an appropriate curative would be an unsaturated polyester resin, and a peroxide would be an appropriate curing catalyst. On the other hand, if a polyol were used as the resin to facilitate intercalation, then an organic polyisocyanate would be an appropriate curative, and a tertiary amine would be an appropriate curing catalyst. If an epoxy resin were used to facilitate intercalation, then a polyalkylenepolyamine would be an appropriate curative or polyamide as a curative and a tertiary amine catalyst. The chemistry required for selecting the agent to facilitate intercalation, the curative, the curing catalyst, the amounts of these components, and the reactions conditions are well known in the art related to the preparation of composites.

Preferably, (a) styrene is used as the monomer that facilitates intercalation, an unsaturated polyester is used as the curative, and a peroxide is used as the curing catalyst at elevated temperatures, (b) an epoxy resin is used as the resin that facilitates intercalation, a polyamide is used as the curative, (c) a polyol is used as the resin that facilitates intercalation, an organic polyisocyanate is used as the curative, and a tertiary amine is used as the curing catalyst, or (d) an epoxy resin is used as the resin that facilitates intercalation, a polyfunctional amine is used as the curative.

Optionally, the inorganic clay nanodipsersions may contain fillers, e.g. calcium carbonate, talc, kaolin, carbon, silica, and alumina. The fillers are typically used in amounts of 10 parts to 100 parts filler for every 100 parts of the inorganic clay nanodispersion.

The thermosetting inorganic clay nanocomposite dispersions may also contain other additives, e.g. nucleating agents, lubricants, plasticizers, chain extenders, colorants, mold release agents, antistatic agents, pigments, fire retardants, and the like. The optional additives and the amounts used depend upon the application and the properties required.

The inorganic clay thermosetting nanocomposite dispersions are useful for preparing molded articles, particularly sheets and panels. The sheets and panels may be shaped by conventional processes such as vacuum processing or by hot pressing. The sheets and panels can be used to cover other materials, for example, wood, glass, ceramic, metal or plastics. They can also be laminated with other plastic films or other protective films. They are particularly useful for preparing parts for recreational vehicles, automobiles, boats, and construction panels.

ABBREVIATIONS

The following abbreviations are used:
ACM=Ancamide 350A, a polyamide supplied by Air Products.
BP=benzoyl peroxide, a curing catalyst.
CL-10A=an inorganic modified clay prepared by swelling CLNA with water and then intercalation with DMBTAC, such that the weight ratio of CLNA/DMBTAC is about 70:30, commercially available from the Southern Clay Products.
CL-ETQ=an inorganic modified clay prepared by swelling CLNA with water and then intercalation with ETQ, such that the weight ratio of CLNA/ETQ is about 70:30, prepared in the laboratory.
CLNA=an untreated inorganic clay, which has not been treated with water or a quaternary ammonium salt (i.e. is not intercalated), commercially available from the Southern Clay Products.
DCPD resin=dicyclopentadiene unsaturated polyester resin (D1657-HV1) manufactured by Ashland Specialty Chemical, a division of Ashland Inc.
DMBTAC=dimethyl benzyl tallow ammonium chloride, an intercalation agent.
ELG (%)=elongation of test molded article measured by Instron Model 4204.
ER=an epoxy resin known as 354 LV supplied by Dow Chemical Company.
ETQ=Ethoquad C12B75, dihydroxyethyl benzyl cocoalkyl ammonium chloride, supplied by Akzo Nobel.
HDT (° C.)=heat distortion temperature measured by Heat Distortion Tester Vista 6.
STY=styrene monomer.
T/S=tensile strength of molded article measured by Instron Model 4204.
VBDMO=vinylbenzyl dimethyl oleyl ammonium chloride, an intercalation agent.

EXAMPLES

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application, all units are in the metric system and all amounts and percentages are by weight, unless otherwise expressly indicated.

As a preliminary note, data indicate that intercalated inorganic clay cannot be effectively prepared by just adding the intercalation agent, e.g. a quaternary ammonium salt, to the inorganic clay. According to the prior art, water is typically added to the clay to swell the clay (increase d-spacing), so the quaternary ammonium salt can effectively intercalate the inorganic clay. See Table I, which summarizes experiments showing the effect of different variables on increasing d-spacing. The d-spacing was determined by from x-ray diffraction patterns collected with a Siemens D 500 Diffractometer using a monochromated copper x-ray source operating at 30 mA/40 KV.

TABLE I (d-spacing values of modified inorganic clay materials)

| Example | Sample description | d-spacing (A) | Intensity |
|---|---|---|---|
| Control | Untreated inorganic clay (CLNA) | 10.3 | Very high |
| | | 4.8 | Medium |
| | | 4.5 | High |
| | | 4.0 | Medium |
| | | 3.1 | Very high |
| A | CLNA in styrene | 12.4 | High |
| | | 4.5 | High |
| | | 4.0 | Low |
| | | 3.1 | High |
| B | CLNA in VBDMO | 11.7 | High |
| | | 4.5 | High |
| | | 4.0 | Low |
| | | 3.1 | High |
| C | Clay treated with VBDMO in water | 18.8 | High |
| | | 4.5 | Medium |
| | | 4.0 | Low |
| | | 2.5 | Medium |

The data in Table I indicate that there is little or no increase in d-spacing when styrene or VBDMO are used alone. However, there is an increase in d-spacing if water is used, in conjunction with VBDMO, to swell the clay.

Control (Casting Prepared Without Inorganic Clay)

A casting plate (8"×10"×⅛") was prepared by adding 1% of BP peroxide to 75 parts of DCPD resin and 25 parts of styrene, shaping, and then curing at elevated temperatures as follows:

(a) 0.5 hr at 57° C.
(b) 0.5 hr at 63° C.
(c) 1 hr at 71° C.
(d) 2 hrs at 82° C.
(e) postcure for 2 hrs at 150° C.

The casting was subjected to physical and mechanical testing. The properties of the casting are set forth in Table III.

Comparison Example D (Preparation of a Nanocomposite Article from a Commercially Available Clay Prepared by Using Water as a Swelling Agent)

The procedure set forth in the Control was repeated, except CL-10A was added to the polyester resin. CL-10A is an inorganic clay swollen with water and treated with DMBTAC (water was removed after intercalation by drying). As was indicated in Table I, there was an increase in d-spacing when water was used along with the intercalation agent. The casting results are set forth in Table III.

Examples 1–3

(In situ Preparation of Partially Intercalated Inorganic Clay Dispersion and Nanocomposite Article Prepared from Styrene and Unsaturated Polyester)

A nanocomposite article was prepared from styrene and unsaturated polyester according to the procedure set forth in the Control, except an intercalated inorganic clay nanodispersion prepared in accordance with this invention, was used to prepare the molded article. The inorganic clay nanodispersion was prepared as follows:

Preparation of intercalated inorganic clay nanodispersion

An intercalated inorganic clay nanodispersion was prepared by dissolving 6 parts of DMBTAC (90% solids in ethanol) in 60 g styrene, as set forth in Table III, and mixing. The mixture looked transparent, and had low viscosity. The mixture was added to various parts of CLNA (untreated inorganic clay), as set forth in Table III, to form an intercalated inorganic clay nanodispersion. The mixture was agitated for about 15 minutes. The viscosity increased significantly during mixing, indicating intercalation of clay. The properties of the inorganic intercalated clay nanodispersion are set forth in Table II. The data indicate that the clay is partially or completely intercalated.

TABLE II (d-spacing values of modified inorganic clay materials)

| Nanodispersion | d-spacing (A) | Intensity |
|---|---|---|
| Example 1 | 35.0 | Very high |
| | 17.2 | Medium |
| | 4.5 | Medium |
| | 4.0 | Low |
| | 2.8 | Medium |
| Example 2 | 39.0 | High |
| | 20.0 | Medium |
| | 4.5 | Medium |
| | 4.0 | Very low |
| | 2.5 | Very low |

The data in Table II indicate that the inorganic clay of the nanodispersions prepared in accordance with this invention showed increased d-spacing, even though water was not used as a swelling agent. If the data in Table II are compared to those in Table I, it appears that d-spacing is increased more if the intercalation facilitating agent (styrene) is used instead of water.

Preparation of Thermosetting Inorganic Clay Nanodispersion

Eighty parts of DCPD resin were added to the partially intercalated thermosetting inorganic clay nanodispersions.

The components were mixed with high shear agitation for 15 minutes at 6000 rpm. Then an additional 100 parts of DCPD resin were added and mixed thoroughly for 15 minutes to form thermosetting inorganic clay nanodispersions. The thermosetting inorganic clay nanodispersions were almost clear and stable during storage.

Preparation of Thermosetting Nanocomposite Article from the Thermosetting Inorganic Clay Nanodispersions The thermosetting inorganic clay nanodispersions were used to prepare thermosetting nanocomposite articles. The thermosetting nanocomposite articles were prepared by adding 1% of benzoyl peroxide to the thermosetting inorganic clay nanodispersions and curing at elevated temperatures as follows:

(a) 0.5 hr at 57° C.
(b) 0.5 hr at 63° C.
(c) 1 hr at 71° C.
(d) 2 hrs at 82° C.
(e) postcure for 2 hrs at 150° C.

The thermosetting nanocomposite articles were subjected to physical and mechanical testing. The properties of the thermosetting nanocomposite articles are set forth in Table III.

TABLE III (Physical and mechanical properties of nanocomposite articles prepared with unsaturated polyester)

| Example | DCPD/STY Ratio | CLNA (%) | DMBTAC (%) | T/S (psi) | MOD (ksi) | ELG (%) | HDT (° C.) |
|---|---|---|---|---|---|---|---|
| Control | 3:1 | 0 | 0 | 6460 | 524 | 1.29 | 85 |
| D[1] | 3:1 | 3.5 | 1.5 | 5394 | 629 | 0.93 | 90 |
| 1 | 3:1 | 3.5 | 1.5 | 6337 | 620 | 1.15 | 88 |
| 2 | 3:1 | 4 | 2 | 6191 | 620 | 1.05 | 88 |
| 3 | 3:1 | 4 | 1 | 5992 | 625 | 1.08 | 86 |

[1]CL-10A is a commercially available product. It is CLNA that is intercalated with DMBTAC after the inorganic clay was swollen with water.

The results in Table III show that thermosetting nanocomposite articles prepared with the nanodispersions, made in accordance with the process of this invention, resulted in about a 20% increase in modulus and slight increase in heat distortion temperature with only small reduction in elongation, when compared to the articles made with the Control. On the other hand, thermosetting nanocomposite articles, prepared with the nanodispersions made in accordance with the process of this invention, resulted in about a 20% improvement in tensile strengths when compared to the article prepared from the nanocomposite using organically treated clay, Cloisite 10A (Comparative Example D). The other properties were similar.

However, the cost to produce the nanodispersions used to practice this invention is one-half to one-third the cost of manufacturing nanocomposites where water is used to swell the inorganic clay prior to mixing the clay with the intercalation agent. This is because, if water is not used, then it does not have to be removed by expensive drying techniques before intercalation with the intercalation agent. On the other hand, when the subject invention is practiced, the reactive monomer and/or resin used to facilitate intercalation does not have to be removed before exfoliating, because the process is carried out in situ and it reacts with the curative in the presence of an appropriate curing agent.

Examples 4–5 and Comparative Example E (Comparison of Properties of Molded Articles Prepared with Exfoliated Clay in situ and Prepared by Separate Treatment)

In these examples, the procedure of Example 1 was followed except the intercalation agent was VBDMO. In Examples 4–5, the inorganic clay nanodispersion was prepared in-situ, while in Example E the inorganic clay was swollen with water by conventional means and then treated with VBDMO (water was removed by drying). The results are summarized in Table IV.

TABLE IV (Mechanical properties of molded nanocomposite article prepared with styrene/unsaturated polyester)

| Example | CLNA (%) | VBDMO (%) | T/S (psi) | MOD (ksi) | ELG (%) | HDT (° C.) |
|---|---|---|---|---|---|---|
| 4 | 3.5 | 1.75 | 6570 | 663 | 1.12 | 94 |
| 5 | 3.5 | 0.88 | 6740 | 619 | 1.15 | 93 |
| E[2] | 3.5 | 1.5 | 5549 | 624 | 0.85 | 96 |

[2]CL-30B is a comercially available product It is CLNA that is intercalated with VBDMO after the inorganic clay was swollen with water.

The data in Table IV indicate the tensile strength and elongation of the nanocomposite articles prepared with nanodispersions prepared in situ (Examples 4–5) are higher than those prepared with clay treated in water as the swelling agent (Comparative Example E).

Other tests indicate that the rate of agitation, and temperature are not critical. Furthermore, the use of high shear agitation does not improve the quality of dispersion or properties of polyester. The temperature of the intercalation or exfoliation does not appear to show a significant effect, but the best temperature range to reduce the viscosity during formation of nanodispersion is from 50° C. to 60° C.

Control, Comparison F, and Example 6

(Preparation of Test Plaque with Epoxy Resin/Polyamide)

The Control, Comparison F, and Example 6 were all carried out in a similar manner, except the Control did not contain an inorganic clay, and Comparison Example F used CL-ETQ treated clay, instead of an inorganic clay nanodispersion in accordance with this invention. The concentration of inorganic clay is the same in Examples F and 6 because CL-ETQ contains 25–30% of intercalating agent.

A test plaque was prepared by mixing 23 parts of ER with 0.8 parts of ETQ. This was then mixed with 1.8 parts of CLNA at 60° C. for about 10 minutes. The mixture was degassed in vacuum oven. The product was a partially intercalated inorganic clay nanodispersion.

Then 13.7 parts of ANC were added to the intercalated inorganic clay nanodispersion and thoroughly mixed to form a themosetting inorganic clay nanodispersion. This partially exfoliated inorganic clay nanodispersion was shaped into a plaque with a Carver Laboratory Press. It was then cured for 2 minutes at 150° C. and post-cured at 150° C. for 1 hour.

TABLE IV (Mechanical properties of molded nanocomposite article prepared with epoxy resin/polyamide)

| Example | CLNA (%) | CL-ETQ (%) | T/S (psi) | MOD (ksi) | ELG (%) |
|---|---|---|---|---|---|
| Control | 0 | 0 | 7704 | 360 | 4.8 |
| F | 0 | 6.0 | 6980 | 420 | 2.3 |
| 6 | 4.5 | 0 | 8215 | 424 | 4.5 |

The inorganic clay nanodispersion of Example 6, prepared in-situ, provided better tensile strengths and elongation than the inorganic clay prepared with the inorganic clay of comparison Example F (CL-ETQ), which was swollen with water, according to conventional practice, prior to intercalation.

What is claimed is:

1. A process for preparing a liquid thermosetting inorganic clay nanodispersion in the absence of water comprising:
   mixing in situ an untreated inorganic clay containing inorganic cations, a quaternary ammonium salt, and a non-aqueous, chemically reactive organic intercalation facilitating agent selected from the group consisting of chemically reactive thermosetting monomers and/or polymers, wherein the amount of intercalation facilitating agent is sufficient to facilitate intercalation and to disperse said inorganic clay.

2. The process of claim 1 wherein the monomer and/or polymer used to facilitate intercalation and the intercalation agent are mixed together before adding them to the inorganic clay.

3. The process of claim 2 wherein the inorganic clay is montmorillonite clay.

4. The process of claim 3 wherein the intercalation facilitating agent is compatible with the inorganic clay and quaternary ammonium salt used to prepare the inorganic clay nanodispersion.

5. The process of claim 4 wherein the intercalation facilitating agent is selected from the group consisting of styrene monomer, acrylic monomer, epoxy resins, and polyols.

6. The process of claim 5 wherein styrene is used as the agent that facilitates intercalation, an unsaturated polyester is used as the curative, and a peroxide is used as the catalyst at elevated temperatures.

7. The process of claim 6 wherein an epoxy resin is used as the resin that facilitates intercalation and a polyamide is used as the curative with a tertiary amine as a catalyst.

8. The process of claim 7 wherein a polyol is used as the resin that facilitates intercalation, an organic polyisocyanate is used as the as the curative, and a tertiary amine is used as the catalyst.

9. The process of claim 8 wherein an epoxy resin is used as the resin that facilitates intercalation, a polyfunctional amine is used as the curative.

10. The process of claim 2 wherein the process is carried out at a temperature of 25° C. to 80° C.

11. The process of claim 3 wherein from 20 to 100 percent of the cations of the cationic inorganic clay are replaced with the cations of the cationic surfactant.

12. A thermosetting inorganic clay nanodispersion prepared by the process of claim 1, 2, 3, 4, 5, 6, 7, 8, 9, 10, or 11.

13. The thermosetting inorganic clay nanodispersion of claim 12 wherein the Brookfield viscosity of the nanodispersion is from 200 to 100,000 cps at 25° C.

14. The thermosetting inorganic nanodispersion of claim 13 which further comprises a filler.

15. The thermosetting inorganic nanodispersion of claim 14 which further comprises a curative.

16. A process for preparing a thermosetting nanocomposite article comprising
   (a) introducing the composition of claim 15 into a pattern to form a shape;
   (b) curing the shape prepared by (a).

17. A thermosetting nanocomposite article prepared in accordance with claim 16.

* * * * *